Sept. 9, 1969    H. A. WILSON    3,465,373
HOSPITAL BED

Filed Dec. 6, 1967    9 Sheets-Sheet 1

INVENTOR
HARRIET A. WILSON

BY    *Rivrie B. Gurley*
ATTORNEY

Sept. 9, 1969  H. A. WILSON  3,465,373
HOSPITAL BED
Filed Dec. 6, 1967  9 Sheets-Sheet 2

INVENTOR
HARRIET A. WILSON

BY *Ruven B. Turley*
ATTORNEY

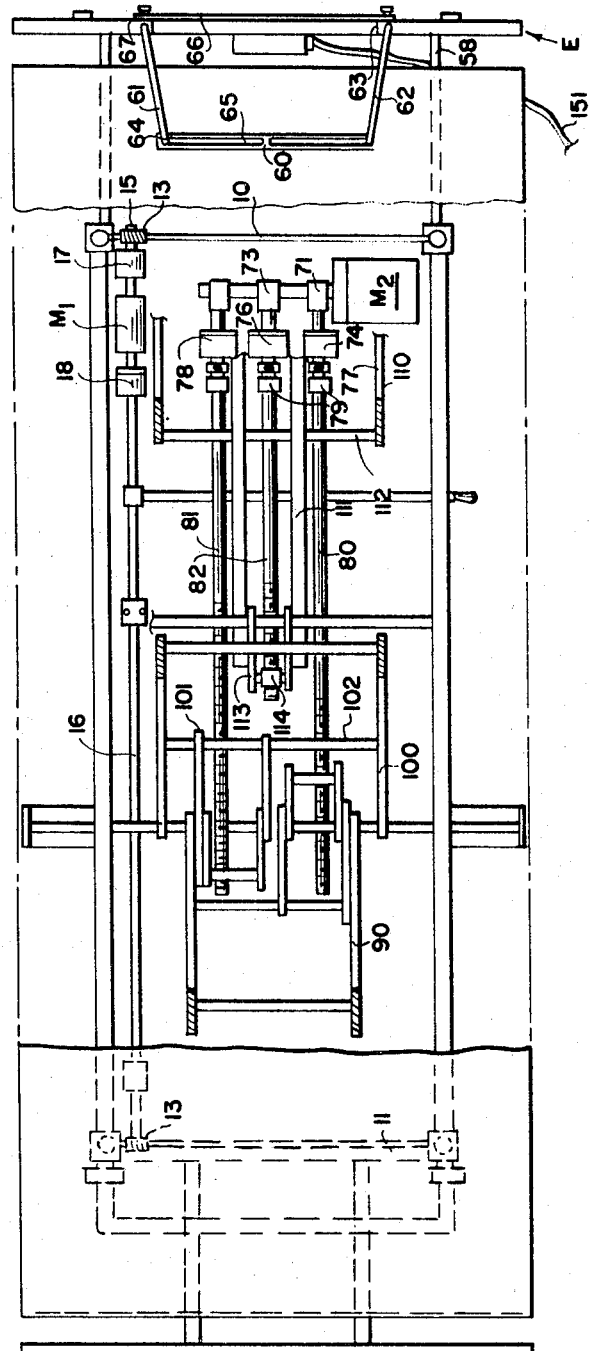

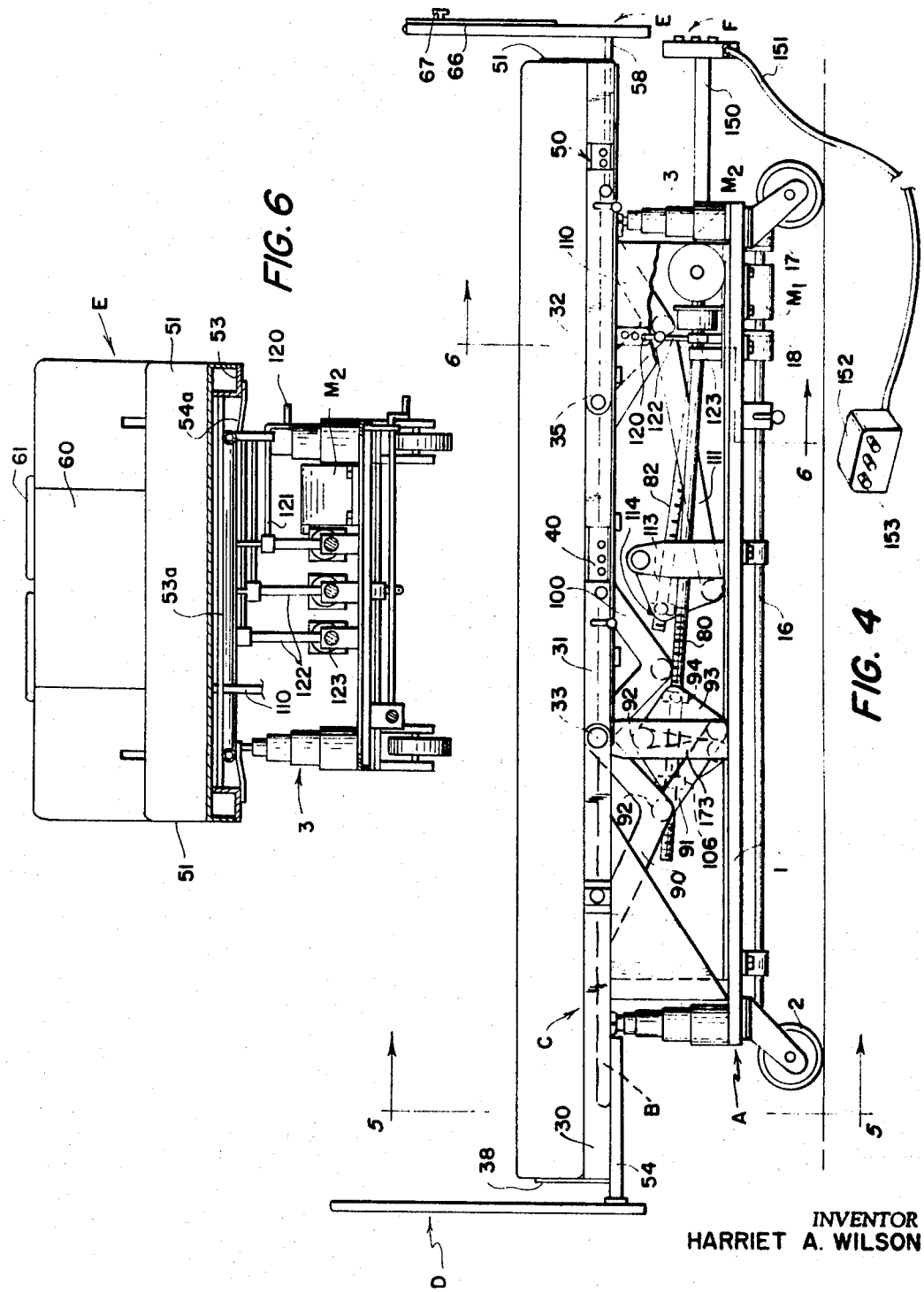

Sept. 9, 1969  H. A. WILSON  3,465,373
HOSPITAL BED

Filed Dec. 6, 1967  9 Sheets-Sheet 5

INVENTOR
HARRIET A. WILSON

BY *Revere B. Surley*
ATTORNEY

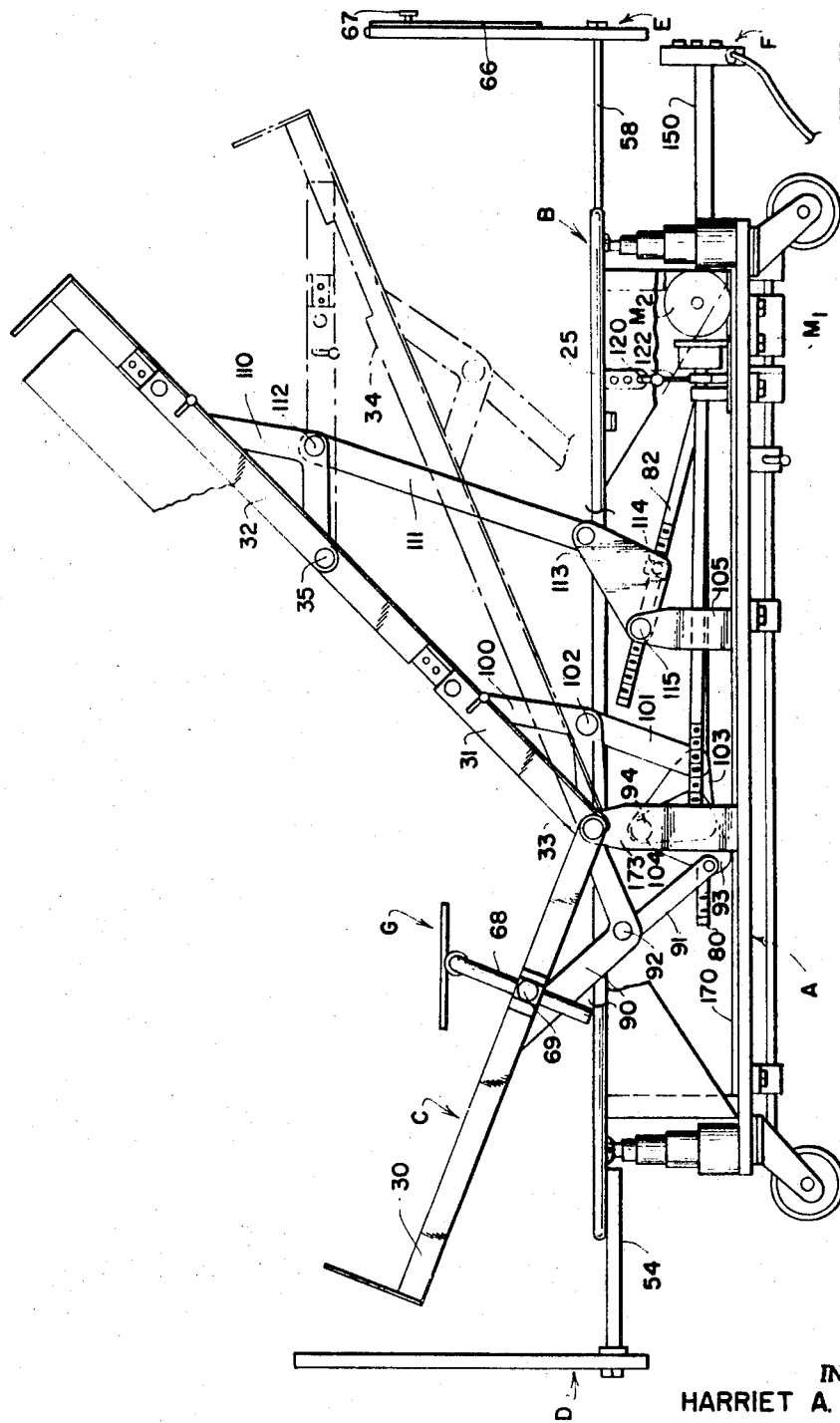

Sept. 9, 1969　　　　　H. A. WILSON　　　　　3,465,373
HOSPITAL BED
Filed Dec. 6, 1967　　　　　　　　　　　　　　　9 Sheets-Sheet 7

INVENTOR
HARRIET A. WILSON

BY Rurue B. Gurley
ATTORNEY

Sept. 9, 1969           H. A. WILSON           3,465,373
HOSPITAL BED

Filed Dec. 6, 1967           9 Sheets-Sheet 8

INVENTOR
HARRIET A. WILSON

BY *Rwen B. Senley*
ATTORNEY

Sept. 9, 1969  H. A. WILSON  3,465,373
HOSPITAL BED
Filed Dec. 6, 1967  9 Sheets-Sheet 9

INVENTOR
HARRIET A. WILSON

BY Revere B. Sinley
ATTORNEY

United States Patent Office 3,465,373
Patented Sept. 9, 1969

3,465,373
HOSPITAL BED
Harriet A. Wilson, 115 Hilltop Road,
Waverly, Pa. 18471
Filed Dec. 6, 1967, Ser. No. 688,580
Int. Cl. A61g 7/00
U.S. Cl. 5—63                                    10 Claims

ABSTRACT OF THE DISCLOSURE

A hospital bed is formed of a three-section mattress supporting structure composed of three hingedly connected sections with the head and intermediate seat sections pivotally connected on the same axis to a support member, the intermediate and foot sections being extensible to adjust to the individual patient. The head and intermediate sections may be pivoted about the axis to raise their opposite ends and the foot section is angularly adjustable relative to the seat section. A footboard with an extensible foot rest is mounted on the support, and the foot rest may be raised and lowered and may extend over the foot section to provide a vertical support surface for the patient's feet. The support member is vertically movable at either or both ends. Arm rests are provided on the head section.

OBJECTS AND NATURE OF INVENTION

This invention resides in a hospital bed which is sufficiently versatile that it can accommodate and support properly patients of any height in any condition, and which is easily shifted from one position to another.

It is an object of this invention to provide an adjustable hospital bed in which the mattress supporting structure may be inclined in one plane, either with the feet elevated and head lowered for Trendelenburg position, or with the head elevated and feet lowered for the reverse Trendelenburg position. The bed also provides for sitting positions, as for cardiac position or Fowler's position, so as to conserve the strength of a critically ill patient through less need for frequent repositioning, with provision for proper alignment and support.

Another object of the invention is a bed which is adjustable to conform to patients of different heights, avoiding the need for extra-long beds for taller than average patients, and at the same time providing proper support in all positions.

Another object is to provide for easy accessibility on all sides for the convenience of hospital personnel, and flexibility and ease of operation by personnel or by the patient, where possible.

These objects are achieved by forming an extensible mattress supporting structure in three hingedly connected sections, certain of which are extensible to accommodate patients of different heights, and mounting this structure on a support member or frame which may be raised or lowered at its opposite ends, for assuming one of the Trendelenburg positions. Additional support is provided in cooperation with this structure for the feet when in different positions and for the arms when the head section is raised.

The three-section articulated mattress supporting structure with the intermediate, extensible seat section is especially beneficial as this structure may be adjusted to conform to the human body in various positions. In sitting positions, such as cardiac position or Fowler's position, the hinged joints of the sections can be adjusted to conform to the two major areas of body flexion, the buttocks and the knees. By articulating the head section directly to the seat section, the head section provides an unbroken, straight line support for the head and back to the bend of the buttocks to support the spinal column and prevent strain on the lumbar region of the back and prevent pressure on the sacral area of the back.

In like manner, the seat section may be adjusted in length to conform to the distance from the bend of the buttocks to the bend of the knees, providing a line of support between the buttocks and the knees and another line of support for the lower extremities from the bend of the knees down to the feet.

With the three-section, extensible mattress supporting structure, supplemental supports for the body structure are provided. Adjustable arm rests adjacent the head section assist in the support of the arms, so that the body will remain in proper position on the head and seat sections. The footboard carries an adjustable foot rest which in cooperation with the extensible foot section provides a vertical support for the patient's feet, so as to avoid contractual deformities of the feet.

The bed may also be raised as a whole for ease in administering to the patient, or either end may be raised or lowered to either of the Trendelenburg positions. The mattress supporting structure of sheet metal material enables the bed to be used as an orthopedic bed. With such versatility in accommodating patients of all heights and under all conditions, provision of extra beds for special purposes is no longer necessary, avoiding the need for an important item of expense.

THE DRAWINGS

FIGURE 3 is a top plan view of the operating mechanism with the mattress supporting structure removed.

FIGURE 4 is a side elevation of the bed in normal position.

FIGURE 6 is a vertical cross section on line 6—6 of FIGURE 4.

FIGURE 7 is a side elevation of the bed and operating mechanism with some parts broken away.

DESCRIPTION

Figure 1:
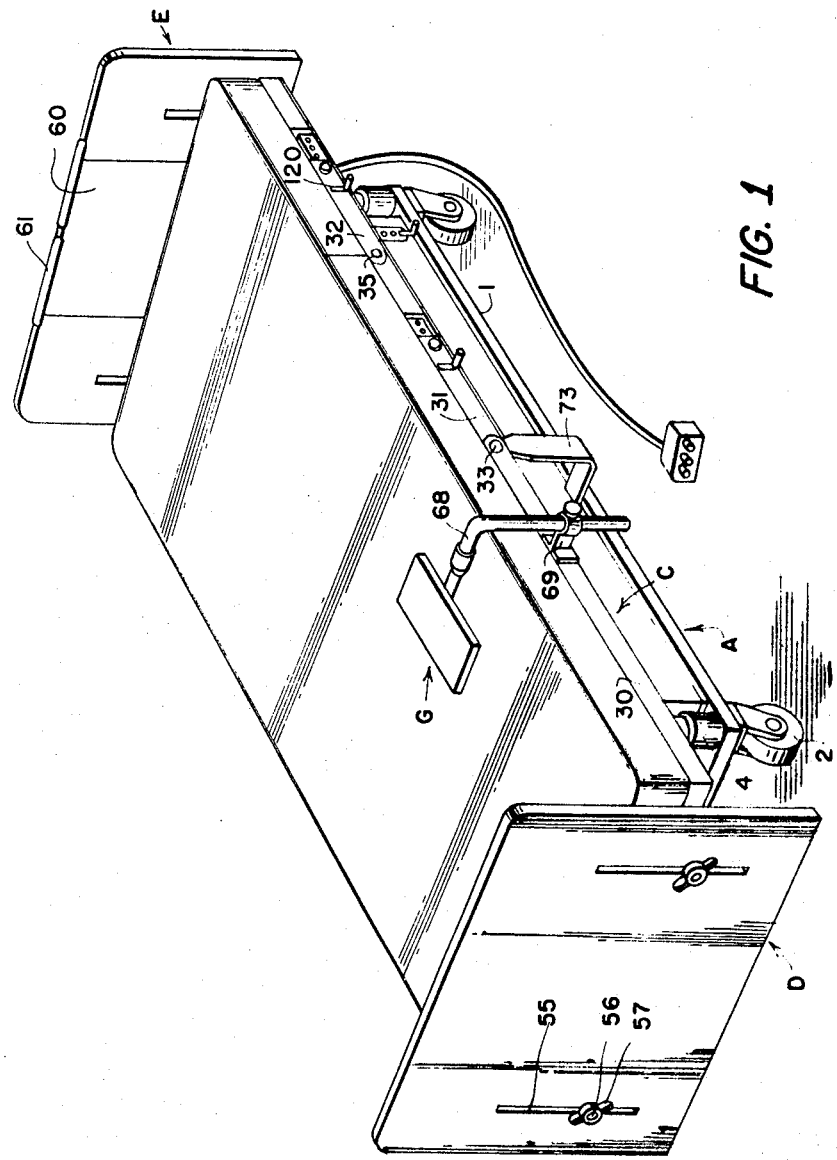
FIGURE 1 is a perspective view of the hospital bed.

The bed of this invention is composed of a base A, and a support member or frame B, which can be raised or lowered on the base A. On the support member B, a three-section, extensible, articulated mattress frame C is mounted, a headboard D is fixed at one end and a footboard E at the other.

The base A consists of the rectangular frame 1 mounted on swiveled casters 2 at the corners. These casters may be of a locking type to prevent rolling of the bed. At each corner of the base frame 1 is one of a plurality of elevating mechanisms 3 on which are supported the support member or frame B. These elevating mechanisms may be any type of lift devices, either mechanical or hydraulic. The lift device here shown as an example consists of a telescoping column formed of tubular screw members 4, 4a. The lowest tubular member 4a is mounted on a horizontal bevel gear 5 to rotate on a bearing 6 on the base of housing 7 on the base frame 1. The successive tubular members 4 are threaded into each other and the top tubular member is fixed to the support member B at 8.

Figure 9:
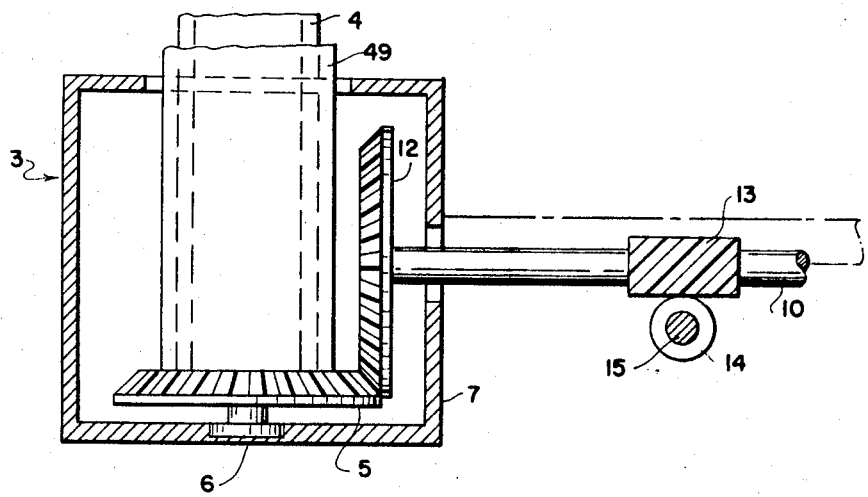
FIGURE 9 is a fragmentary cross section of the operating gears for the elevating mechanism.
Figure 10:
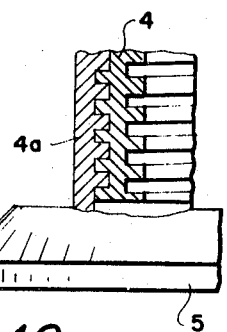
FIGURE 10 is a fragmentary cross section of the interengaging screw threads of the elevating mechanism.
Figure 5:
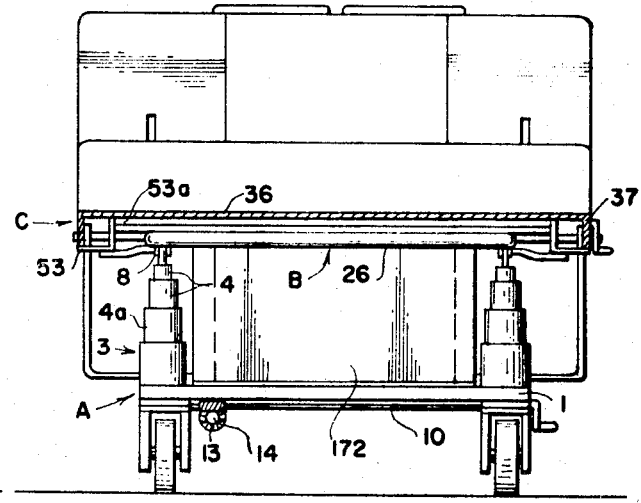
FIGURE 5 is a vertical cross section on line 5—5 of FIGURE 4.
Figure 8:
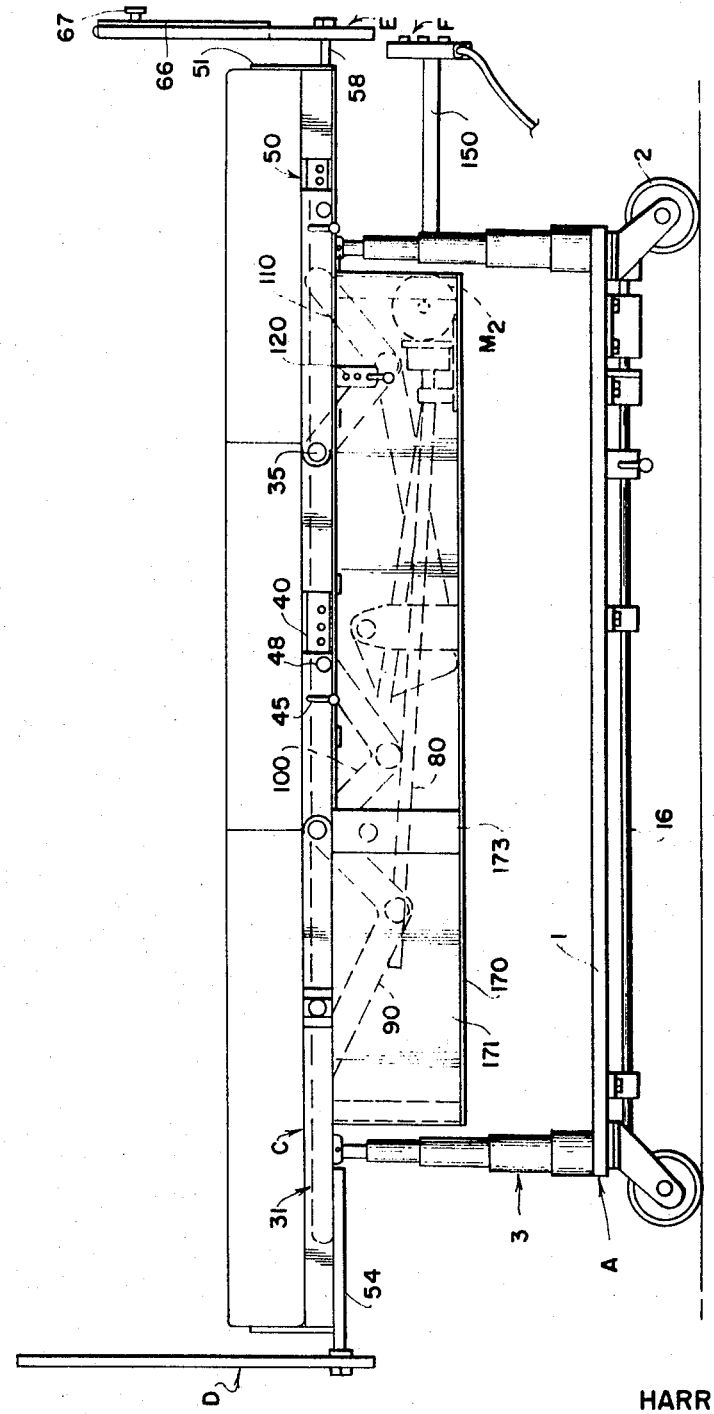
FIGURE 8 is a side elevation of the bed in raised position.
Figure 11:
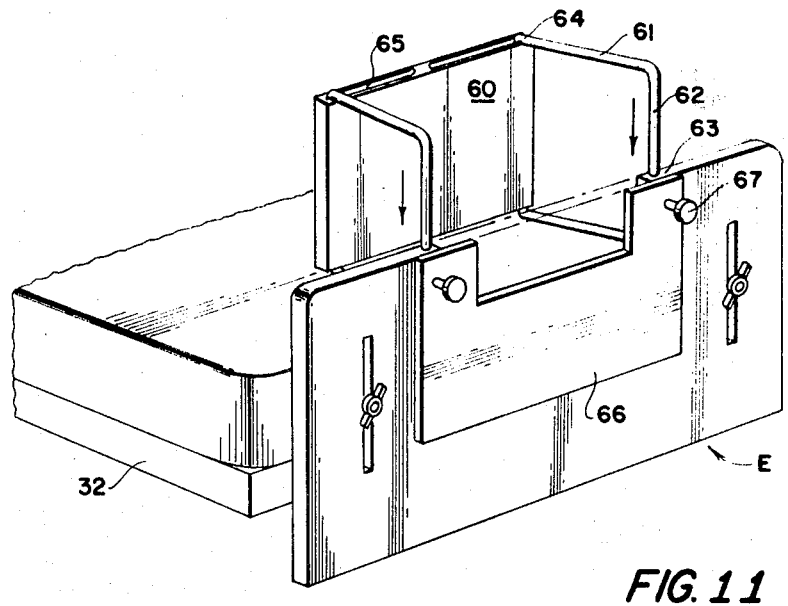
FIGURE 11 is a perespective view of the footboard end.

The two lift devices at each end are driven by one of the two shafts 10, 11. Each shaft, as shaft 10 in FIGURE 9, has a bevel gear 12 on each end to drive the bevel gear of the corresponding lift device. The two lift devices are threaded to raise or lower the adjacent end of the support member B on rotation of shaft 10 or 11 which is rotated by worm gear 13 driven by a gear 14 on the end of a shaft 15 or 16.

A motor $M_1$ drives clutches 17, 18 which may be actuated to connect either or both shafts 15, 16 to the motor. The motor $M_1$ is reversible and either shaft 15 or 16 may be rotated in either direction, to actuate the corresponding pair of elevating mechanisms 3 for lowering or raising one or both ends of the support frame B.

Emergency manual means may be provided for rotating shafts 15 and 16 in case of power failure. As an example each shaft 15 and 16 carries a bevel gear 20, while a transverse shaft 22 mounted on frame 1 carries a cooperating gear 21. The shaft may be movable longitudinally to engage the gears against the force of a spring 23 and a handle 24 provides for movement and rotation of the shaft. If desired, the shaft may extend beyond the base with a hinged joint, so it can be folded against the base when not in use.

The support member B is formed of side members 25 and end members 26 in a rectangular frame carried by the elevating members 3. Mounted on this support member is the three-section articulated mattress supporting structure C of head section 30, intermediate seat section 31 and foot section 32, the head and seat sections being hinged on the pivot 33 on the side members 25 of the support member. On the same pivot, the support member is provided with a floating frame 34 which extends from the pivot under the seat and foot sections. The seat and foot sections are hingedly connected by the pivot 35, so that the foot section 32 may be adjusted angularly relative to the seat section 31.

The head section 30 of the mattress supporting structure is formed of a flat plate member 36 having flanged or rectangular side members 37. The side members 37 are hinged on pivot 33 and a mattress retainer 38 flange is fixed to the opposite end.

Figure 12:
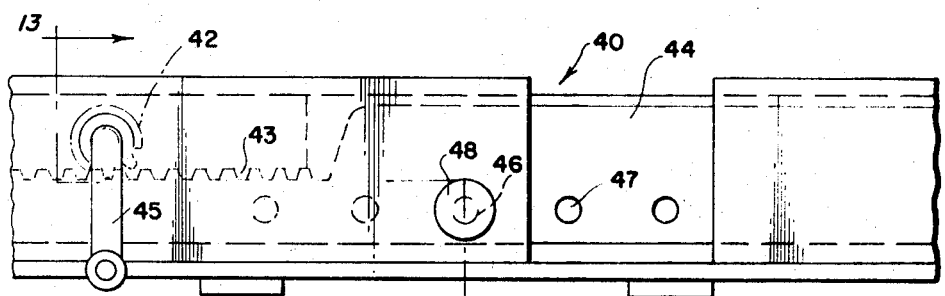
FIGURE 12 is a fragmentary side elevation of the extension mechanism for one of the extensible sections.
Figure 13:
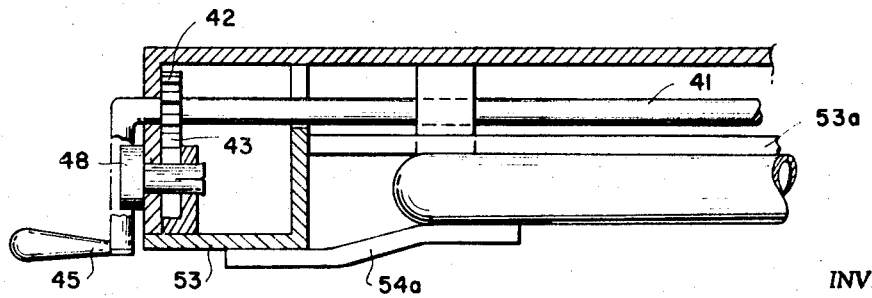
FIGURE 13 is a cross section on line 13—13 of FIGURE 12.

The intermediate or seat section is of the same construction and is pivoted at one end on the same pivot 33. This section is longitudinally extensible because of the telescoping joint at 40 which slidably connects the two ends. As shown in detail in FIGURES 12 and 13 the front end carries a shaft 41 journaled in the side flanges and gears 42 on the shaft to engage racks 43 slidable inside the flanges. Each rack 43 is formed on the end of a telescoping member 44, which is fixed within the flange of the opposite end portion. The flat plates of the two end portions overlap and may slide on each other so that as the gears 42 on shaft 41 are rotated by handle 45, the two portions telescope to increase or decrease the length of the seat section 31. Apertures 46 and 47 in one flange and a telescoping member 44 receive a spring locking pin 48 to maintain the telescoped members in adjusted position.

The foot section 32 is hinged to the seat section by the pivot 35, and has a telescoping joint at 50 to provide for extension of the foot section. This joint is similar to the joint 40 in the seat section 31. At the end of the foot section, mattress retaining flanges 51 are fixed at each side, so as to leave an open space between the flanges.

The two sections 31 and 32 rest on the floating frame 34 pivoted on pivot 33 and supported on the support member B. This floating frame has the side rails 53 which rest on bracket members 54a extending laterally from the side members 25 of support member B. The rails are connected by the transverse members 53a.

At the head end of the bed, the support member B carries the headboard D mounted on brackets 54 extending from the support member. This headboard is vertically adjustable so that it may be lowered to the level of the mattress supporting structure when the bed is elevated to its highest point for convenience in administering to a patient from the head end of the bed. Such an adjustment may be provided by vertical slots 55 in the headboard for studs 56 on the brackets, the wing nuts 57 on the studs allowing the headboard to be fastened in position.

The fotboard E is mounted on brackets 58 fixed to support member B with provision for vertical adjustment similar to that for the headboard. This footboard carries a vertical foot rest 60 on pivoted brackets 61, each having a vertical arm 62 on one end fitting in a socket 63 in the footboard and another vertical arm 64 on the other end movable in vertical slots 65 in the foot rest. Nuts or heads on the ends of arms 64 retain the foot rest on the arms. When retracted, the foot rest lies within the confines of the footboard, a plate 66 on the outside of the footboard holding the foot rest in place.

The foot rest may be extended over the foot section by moving it away from the footboard, the arms 64 moving in slots 65. The foot rest may also be moved vertically as well as footboard E, to position it over the foot section when raised above the normal position. The thumb screws 67 when tightened against arms 62 retain the foot rest in adjusted position at the proper distance to provide support for the patient's feet.

An arm rest G is placed adjacent the head of the bed and is here shown mounted on the head section 30. The arm rest is clamped on rod 68 for adjustment about a horizontal axis, and the rod has slidable and rotatable adjustment at 69, so that the arm rest may be fixed in any desired position, or may be turned down out of the way if not used.

For operation of the mattress section, operating mechanism is mounted on the support member B so as to be raised and lowered with that member. The mounting consists of a platform 170 fastened to side plates 171, end plates 172 and brackets 173 fixed to and extending downwardly from the support member B. The operating mechanism is actuated by a motor $M_2$ mounted on the platform 170. This motor through gear boxes 71, 72, 73 normally opens electrically actuated clutches 74, 75, 76 and flexible joints 77, 78 and 79 drive the shafts 80, 81 and 82 to raise and lower head section 30, floating frame 34 or seating section 31, respectively. The foot section rests on the floating frame and its position is fixed by that frame.

The head section 30 carries a pair of arms 90 fixed thereon, the ends of which may be secured to reinforcing strips or bars extending transversely across the section. A link 91 is connected at one end at 92 to the arms 90 and at the other end to the lever 93 pivoted at 94. Lever 93 is actuated by the threaded shaft 80 which threads through the nut 94 pivotally connected to the lever 93. When motor $M_2$ drives shaft 80 through gear box 71, clutch 74 and flexible coupling 77, the lever 93 through link 91 rotates the head section 30 about pivot 33 to raise or lower this section.

The seat section 31 is moved about pivot 33 by arms 100 fixed to the section in like manner. The link 101 is connected at one end at 102 to arms 100 and at the other end to lever 103 pivoted at 104. Lever 103 is actuated by the threaded shaft 81 which threads through the nut 106 pivotally connected to lever 103. Rotation of shaft 81 moves the lever 103 which through link 101 and arms 100 rotates the seat section 31 about the pivot 33.

The seat section 31 and foot section 32 may be raised by the floating frame 34, or the foot section may be raised when the seat section has been raised by lever 103. The floating frame 34 carries arms 110 fixed thereon to which are connected link 111 at 112. This link at its other end connects to the lever 113 pivoted at 115 to brackets 105. The shaft 82 threading through the nut 114 pivoted in lever 113 operates the lever to raise and lower the floating frame 34.

For emergency operation in case of power failure, the shafts 80, 81 and 82 may be rotated by any form of manual operating mechanism. By way of example, a handle 120 is shown which may be connected to any of shafts 121 journaled on the support member B, each of the shafts driving a vertical shaft 122. Each vertical shaft is connected by gears 123 to rotate one of the shafts 80, 81 or 82. Provision may be made for engaging gears 123 by pushing inwardly on handle 120. Obviously, various other types of manual operation may be provided.

Figure 14:
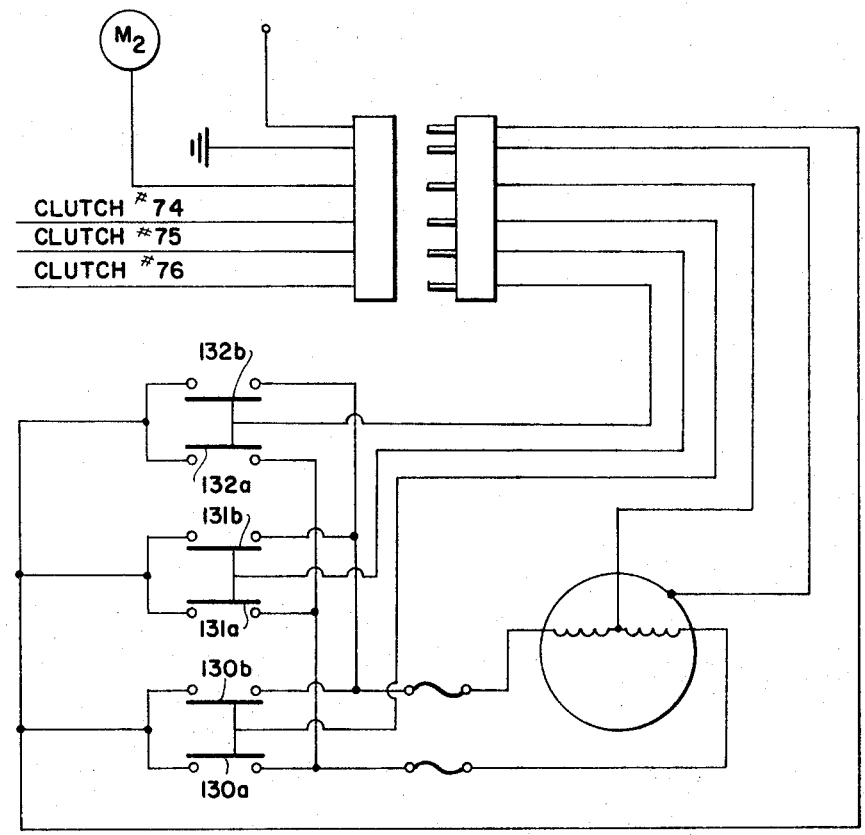
FIGURE 14 is a schematic view illustrative of a control circuit for the operating mechanism for the mattress supporting structure.

Control circuits for motor operation may be adapted to the requirements of use of the bed and the circuits here shown are merely for purposes of illustration of a simple type of system. In FIGURE 14, control circuits for operating mechanism by motor $M_2$ are shown. The push buttons 130a, 130b, 131a, 131b and 132a, 132b control engagement of clutches 74, 75, 76, respectively, and direction of operation of motor $M_2$, either forward or reverse.

Figure 15:
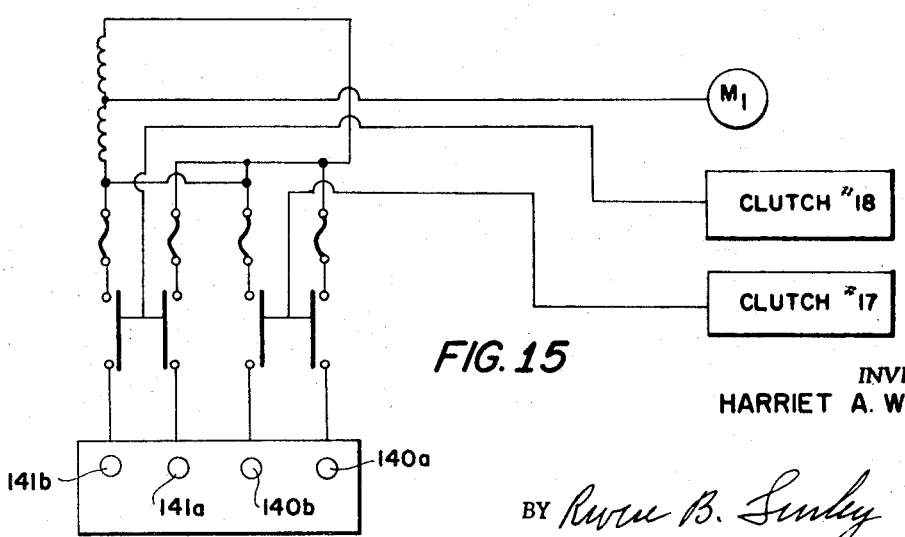
FIGURE 15 is a schematic view illustrative of a possible control circuit for the elevating mechanism.

In a similar manner, in FIGURE 15, a system for control of motor $M_1$, which raises and lowers support member B is shown. The push buttons 140a, 140b, 141a, 141b control the clutches 17, 18 which raise or lower the support member B. One button will raise or lower one end, while if two buttons are pressed, both ends may be raised or lowered.

The control buttons 31a, etc., are located on a control panel F mounted on a bracket 150 fixed to the base A at the foot end of the bed. A cable 151 with a portable control box 152 is also connected into the panel, this box carrying control buttons 153 to control the sections of the mattress supporting structure for use by the patient. This control box 152 may be positioned by the patient at the head of the bed or may be placed on the control panel beyond reach of the patient. If desired, appropriate switches may be provided on the control panel to disconnect the circuits to the control box.

The circuits here are shown in the simplest form for purposes of illustration. It will be obvious that more sophisticated control systems may be used, including limit switches on the movable parts, safety provisions and other known circuit control elements.

Figure 2A:
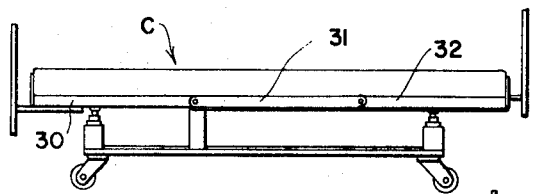
FIGURES 2A to 2G are diagrammatic side elevations illustrating different positions which the bed may assume.
Figure 2B:
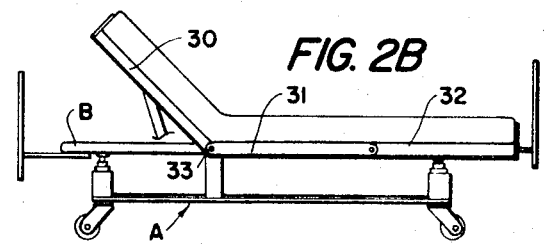
Figure 2C:
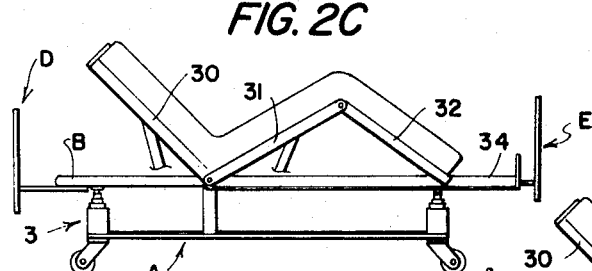

The versatility of the operation of the bed of this invention is illustrated in FIGURES 2A to 2G. FIGURE 2A shows the bed in normal, lowered position. In FIGURE 2B, the head section is raised and in FIGURE 2C the seat section is also raised, leaving the foot section inclined.

Figure 2D:
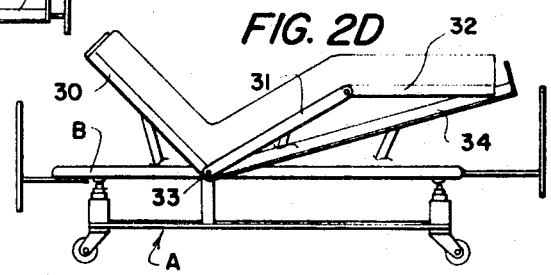
Figures 2E, 2F:
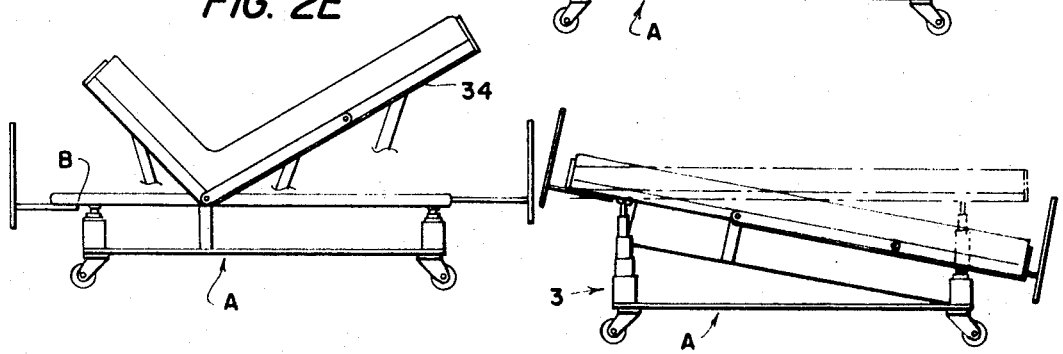
Figure 2G:
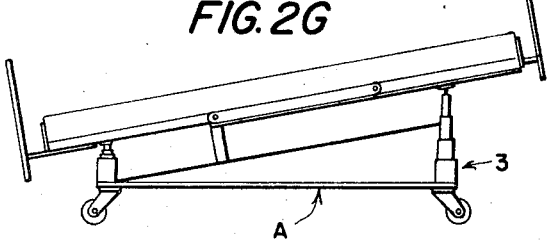

In FIGURE 2D, the floating frame 34 has raised the foot section to be horizontal on the raised seat section. The effect of floating frame 34 is further illustrated in FIGURE 2E, where both seat section and foot section are raised on the floating frame. The Trendelenburg positions are illustrated in FIGURE 2F, with the head elevated and the feet lowered, while the reverse Trendelenburg position is shown in FIGURE 2G.

The usual attachments and appendages commonly in use may be provided. Side protectors, or side rails, may be fixed to support member B and these may be so formed that they may be folded or displaced under the edge of the mattress supporting structure. The arm rests G may be fixed to these rails instead of on the head section. Provision may also be made for fastening restraining straps, for sockets for intravenous therapy apparatus and other well-known attachments.

The bed here illustrated is adaptable to patients of all heights and all conditions. It may be adjusted to any desired position and to conform to any patient. This versatility avoids the need for storage of special beds for unusual cases. The design further provides for proper positioning and support of the patient, and prevents possible deformities resulting from prolonged bed care.

The structure herein described is for the purpose of illustrating the broader aspects of the invention and not for purpose of limitation.

I claim:

1. A hospital bed comprising a vertically adjustable support member and means to raise and lower said support member at either or both opposite ends, a three-section mattress supporting structure composed of a head section, an intermediate seat section and a foot section mounted on said support member, the head and seat sections being pivoted together and to said support member on a transverse axis to raise their pivotal connection above said support member, the seat section and foot section being pivoted together for relative angular movement about a transverse axis, said seat section being longitudinally extensible to adjust its length to conform to the individual patient and being rotatable about said pivotal connection to lower its opposite end relative to said seat section when the latter is raised, operating means to raise and lower said head and seat sections about said axis on said support member, and to rotate said foot section with or relative to said seat section.

2. A hospital bed comprising a support member vertically adjustable at opposite ends to raise or lower either or both ends, an extensible, three-section mattress supporting structure composed of a head section, an intermediate seat section and a foot section hingedly connected on transverse axes and mounted on said support member, the head section and the seat section being directly pivoted at adjacent ends to the support member on a common fixed transverse axis, the seat section and the foot section being pivotally connected together on a vertically movable transverse axis, said seat and foot sections being individually longitudinally extensible to adjust to the individual patient, and operating means for rotating said head section and said seat section about the fixed axis on said support member, said foot section being rotatable about its connection with said seat section to adjust the angle between said two sections, and operating means for rotating said head section and said seat section about the fixed axis on said support member to raise the opposite ends of either of said sections, and to rotate said foot section about its connection with said seat section to adjust the angle between said sections.

3. A hospital bed comprising a support member, means to adjust vertically said support member including elevating means for raising and lowering either or both opposite ends of said support member, a three-section mattress supporting structure composed of a head section, an intermediate seat section and a foot section hingedly connected together and mounted on said support member, said head and seat sections being connected on a transverse axis fixed on said support member for pivoting about said axis to raise the connection with said foot section above said support member, said foot section being adjustable about its pivotal connection with said seat section, said seat section being longitudinally extensible to adjust its length to conform to the patient, a vertically adjustable footboard mounted on said support member beyond the end of said foot section, and a longitudinally adjustable foot rest having a vertical supporting surface for the patient's feet and movable from retracted position adjacent said footboard to an adjusted, extended position spaced from said footboard and overlying said foot section, said foot rest being adjustable to overlie said foot section in a raised position, and means to maintain said foot rest in adjusted extended position, and operating means for rotating said head section and said seat section about the fixed axis on said support member to raise the opposite ends of either of said sections, and to rotate said foot section about its connection with said seat section to adjust the angle between said sections, said foot rest being adjustable to overlie said foot section in certain of its adjusted positions when raised above said support member.

4. A hospital bed comprising a support member, means to adjust vertically said support member including elevating means for raising and lowering either or both opposite ends of said support member, a three-section mattress supporting structure composed of a head section, an intermediate section and a foot section hingedly connected together and mounted on said support member, said head and seat sections being connected on a transverse axis fixed on said support member, said seat section being longitudinally extensible to adjust its length to conform to the patient, an arm rest adjustably mounted on each side of said support member adjacent said head section and adapted to adjust in position to the patient's arm to support the arms and torso of a patient when the head section is raised about its fixed axis, and operating means for rotating said head section and said seat section about the fixed axis on said support to raise the opposite ends of either of said sections, and to rotate said foot section about its connection with said seat section to adjust the angle between said sections.

5. A hospital bed comprising a base, a support member, means to adjust vertically said support member including elevating means on said base for raising and lowering either or both opposite ends of said support member, a vertically adjustable headboard mounted on said support member at the opposite end, and a three-section mattress supporting structure mounted on said support member between said headboard and footboard, said mattress supporting structure being composed of a head section having one end adjacent said headboard and its opposite end pivoted to said support member on a fixed pivot, a longitudinally extensible intermediate seat section having one end pivoted to said head section and said support member on the same axis, and a longitudinally extensible foot section pivotally connected at one end to said seat section on a transverse axis vertically movable as said seat section is pivoted about its axis on said support member, said foot section being angularly movable relative to said seat section, said seat section and said foot section being longitudinally adjustable in length to the individual patient, arm rests on said head section to support the arms and torso of a patient when the head section is raised, and operating means mounted on said support member to rotate said head section and said foot section about the fixed pivot on said support member to raise and lower the opposite ends of either of said sections, and to adjust angularly said foot section relative to said seat section, and a foot rest mounted on said footboard and movable from retracted position adjacent said footboard to extended position overlying said foot section in different vertically adjusted positions, said foot rest being formed with a vertical supporting surface to support a patient's feet.

6. A hospital bed as claimed in claim 2, in which the operating means includes means to raise said seat section and foot sections together about said fixed axis.

7. A hospital bed as claimed in claim 4, in which each arm rest is mounted on the side of the head section.

8. A hospital bed as claimed in claim 1, having means to raise said seat and foot sections as a unit about said transverse axis on said support member, so that said sections lie in a straight line.

9. A hospital bed as claimed in claim 1, having a floating frame pivoted on said pivotal connection to the support member and supporting said seat section and foot section when raised about said pivotal connection.

10. A hospital bed as claimed in claim 2, including an adjustable foot rest longitudinally movable of said bed and having a vertical surface to support a patient's feet, said foot rest being adjustable to overlie said foot section when the latter is adjusted to different lengths or is in a raised position.

References Cited
UNITED STATES PATENTS

| 3,174,161 | 3/1965 | Black | 5—68 |
| 3,220,021 | 11/1965 | Nelson | 5—68 X |
| 3,290,700 | 12/1966 | Barecki et al. | 5—63 |
| 3,336,606 | 8/1967 | Beitz et al. | 5—63 X |

CASMIR A. NUNBERG, Primary Examiner

U.S. Cl. X.R.

5—68